United States Patent [19]

Garritano

[11] Patent Number: 5,260,549
[45] Date of Patent: Nov. 9, 1993

[54] AUTOMOBILE WINDSHIELD HEATER CONNECTOR

[75] Inventor: Mario Garritano, Oak Lawn, Ill.

[73] Assignee: Methode Electronics, Inc., Chicago, Ill.

[21] Appl. No.: 812,623

[22] Filed: Dec. 23, 1991

[51] Int. Cl.$^5$ .......................... H05B 3/08; B60L 1/02; H01R 4/10; H01C 1/14
[52] U.S. Cl. .................................. 219/541; 219/522; 219/203; 439/877; 338/322
[58] Field of Search ............... 219/547, 522, 543, 203, 219/541; 439/845, 849, 850, 877, 878, 879, 880, 881, 882, 885; 174/84 C, 94 R; 338/322, 326; 361/425, 426, 355, 361

[56] References Cited

U.S. PATENT DOCUMENTS

| 1,514,618 | 11/1924 | Ide | 361/425 |
| 2,025,380 | 12/1935 | Cruser | 361/425 |
| 3,496,520 | 2/1970 | Reynolds | 174/94 R |
| 3,745,309 | 7/1973 | Gruss | 219/522 |
| 4,032,751 | 6/1977 | Youtsey et al. | 219/538 |

Primary Examiner—Bruce A. Reynolds
Assistant Examiner—Michael D. Switzer
Attorney, Agent, or Firm—Allegretti & Witcoff, Ltd.

[57] ABSTRACT

An laminated article heater terminal assembly and connector for electrically uniting a source of electricity with a conductive polymer film laminated between two nonconductive materials. The terminal assembly includes a conductive metal foil tab and a terminal body further including dimples and first and second foldable shoulders which act in unison to mechanically grasp the conductive metal foil tab. A plurality of terminal assemblies are then captivated in a connector.

8 Claims, 3 Drawing Sheets

U.S. Patent    Nov. 9, 1993    Sheet 1 of 3    5,260,549
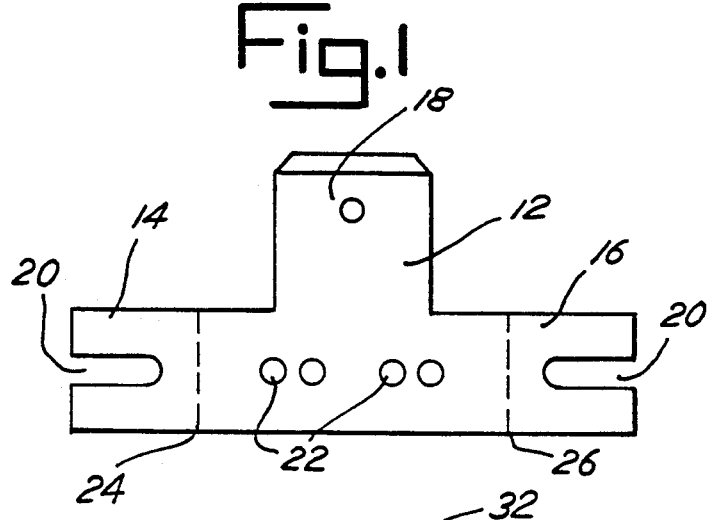
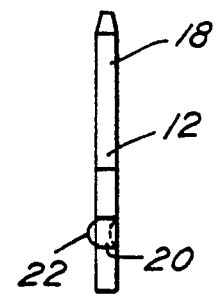
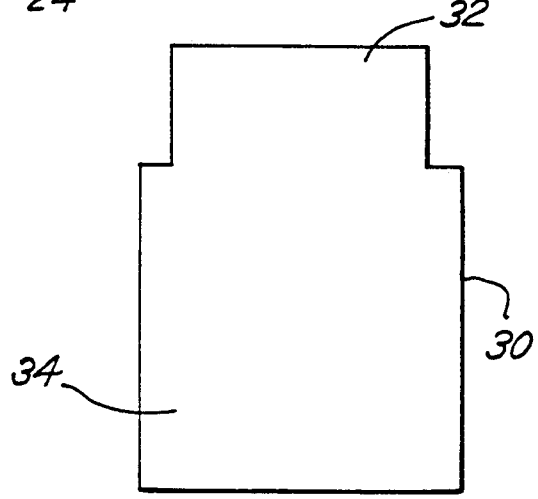
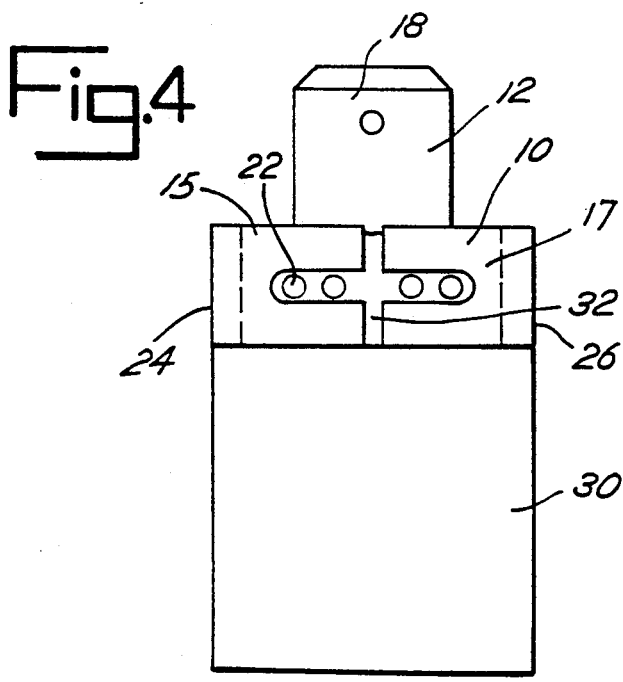
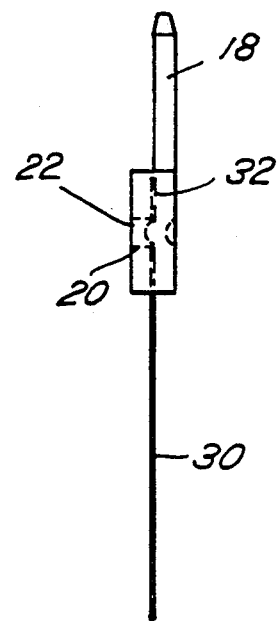

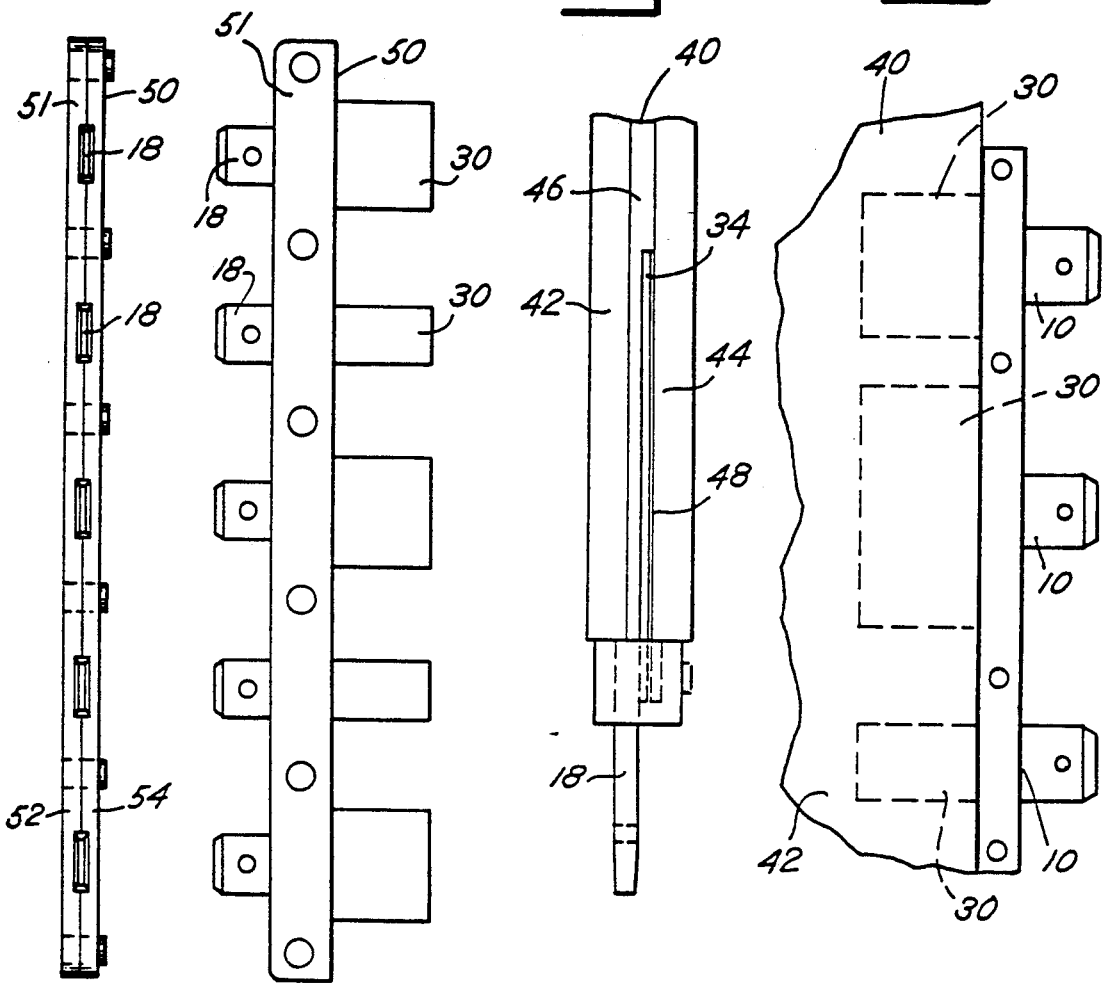
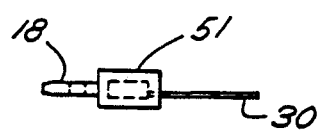

AUTOMOBILE WINDSHIELD HEATER CONNECTOR

BACKGROUND OF THE INVENTION

This invention pertains to an improved automobile windshield heater terminal assembly and a connector containing a plurality of terminal assemblies. Some automobiles manufactured today have heatable windshields. The purpose of a heatable windshield is to dissipate condensation and to melt ice or snow on the windshield. Heatable windshields or other heatable laminated articles typically contain an electrically conductive polymer layer sandwiched between two sheets of non-conductive material. An electric current passing through the conductive polymer material causes the polymer and the non-conductive material to warm. It is important that the electric current pass relatively evenly throughout the laminated article. Therefore, a plurality of terminal assemblies are located at the end of a laminated article to unite the electrically conductive polymer material with the source of electricity.

The terminal assemblies that are presently contemplated to unite an electrically conductive polymer layer with a source of electricity includes a conductive foil tab soldered to a terminal body. The soldered connection allows the thin conductive foil to flex in relationship to the terminal body both before and after the terminal assembly is located in a laminated assembly. As a result of this flexing action, the terminal body is prone to disassociate itself from the conductive foil tab which renders the terminal assembly useless. Therefore, an improved terminal assembly that does not suffer from this flexing problem is needed.

SUMMARY OF THE INVENTION

A principal object of this invention is to provide a laminated article heater terminal assembly wherein the conductive metal foil tab is mechanically and conductively united with the terminal body thereby eliminating the flexing problem associated with soldered connections.

It is another object of this invention to provide a method for manufacturing an automobile windshield heater connector comprising a plurality of reproducably spaced terminals and thereafter installing the connector in a laminated windshield assembly.

It is yet another object of this invention to provide a laminated windshield assembly including a connector having a plurality of reproducably spaced terminals wherein the metallic foil tab of the connectors remains relatively inflexible in relationship to the terminal body even after the terminal assembly is installed in a connector and the connector is installed in the laminated windshield assembly. Other objects of the invention will be made more apparent hereinafter.

This invention relates generally to a terminal assembly for uniting an electrical current source with the conductive polymer layer of a laminated article. The terminal assembly comprises a conductive metal foil tab having a tongue and a body that is mechanically attached to and extends beyond the terminal body. The terminal body portion of the terminal assembly includes a first folded slotted arm and a second folded slotted arm both foldably attached to a blade. The terminal body includes one or more dimples complementary to slots in both the first and second folded slotted arms. The tongue of the conductive metal foil tab is located between the blade and the first and second slotted folded arms and is mechanically held in place by one or more of the dimples which force a portion of the tongue of the conductive metal foil tab to protrude into the slots of the first and second folded slotted arms. The body of the conductive metal foil tab extends beyond the terminal body.

Further, this invention pertains to method for manufacturing a terminal assembly for use in uniting an electrical current with a conductive polymer laminated between nonconductive materials. The process includes contacting the tongue of a conductive metal foil tab with one or more dimples located on the blade of a terminal body so that the body of the conductive metal foil tab extends beyond the end of the terminal body opposite the blade. The conductive metal foil tab is mechanically secured to the terminal body by folding the first and second slotted metal arms towards the dimension of the terminal body containing the dimples until the first and second slotted arms abut the blade portion of the terminal body. Now the first and second slotted metal arms define first and second folded, slotted arms. At this point, a portion of the tongue of the conductive metal foil tab protrudes into the slots of the first and second folded, slotted arms and mechanically secures the conductive metal foil tab to the terminal body.

This invention also contemplates a method for placing a plurality of the terminal assemblies in a connector housing to define a connector and then installing the connector in a laminated article. The connector is prepared by placing two or more terminals into complimentary depressions in a connector housing top. A connector housing bottom is then secured to the connector housing top captivating the terminals in the resulting connector housing to define a connector. The connector is installed in a laminated assembly by first attaching the body of the conductive metal foil tab bodies of the terminals captivated by the connector housing to a first sheet of nonconductive material. A conductive polymer is applied to each conductive metal foil tab body and to the first sheet of nonconductive material. Finally, a second sheet of nonconductive material is placed into contact with the conductive polymer layer and the assembled article is heat cured to define a finished laminated assembly.

DESCRIPTION OF THE DRAWINGS

There is shown in the drawings a presently preferred embodiment of the present invention wherein like numerals in the various figures pertain to like elements and wherein:

FIG. 1 is a top view of the unassembled terminal body of this invention;

FIG. 2 is a side view of the unassembled terminal body of this invention;

FIG. 3 is a top view of the conductive metal foil tab of this invention;

FIG. 4 is a top view of the terminal assembly of this invention;

FIG. 5 is a side view of the terminal assembly of this invention;

FIG. 10, 11, and 12 are front, side, and end views respectively of the connector of this invention; and FIGS. 13 and 14 are side and front views, respectively, of a laminated assembly including connector of this invention.

DESCRIPTION OF THE CURRENT EMBODIMENTS

Figure 6:
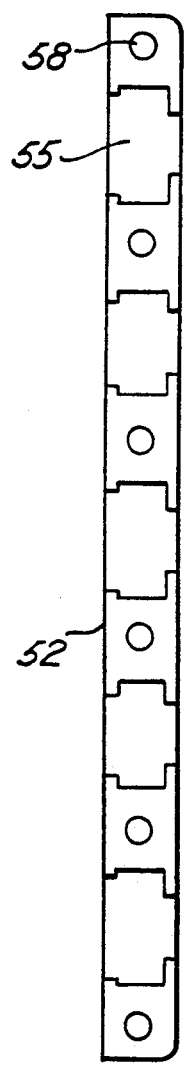
FIG. 6, and 7 are front and side views of the connector housing top of this invention.

The present invention relates to an improved laminated article heater terminal assembly and connector. The heater terminal assembly and connector of this invention are better understood by reference to FIGS. 1 through 14 which show various aspects of a preferred automobile windshield heater terminal assembly and a laminated windshield assembly including an automobile windshield heater connector of this invention.

FIGS. 1 and 2 show the unassembled features of terminal body 12 of the terminal assembly 10 of this invention. Terminal body 12 includes a first shoulder 14 and a second slotted shoulder 16. The first slotted shoulder 14 and second slotted shoulder 16 are perpendicularly associated with blade 18 of terminal body 12. The first slotted shoulder 14 and second slotted shoulder 16 also each include a slot 20. The first slotted shoulder 14 and second slotted shoulder 16 are capable of being folded towards dimples 22 of terminal body 12 in the area of first fold 24 and second fold 26, respectively. Terminal body 12 also includes one or more dimples 22. The dimples are raised above the surface of terminal body 12 as shown in FIG. 2.

FIG. 3 shows conductive metal foil tab 30. Conductive metal foil tab 30 is generally constructed of a metallic conductive material such as copper or tin coasted copper. Conductive metal foil tab 30 is generally square or rectangular in geometry. Conductive metal foil tab 30 typically has a tongue 32 and a body 34. Tongue 32 is intended to be placed into contact with one or more dimples 22 located on terminal body 12. The tongue 32 will generally have a width less than the width of body 34. However, tongue 32 and body 34 can have the same width or body 34 can have a smaller width than tongue 32.

FIGS. 4 and 5 depict top and side views, respectively, of the assembled terminal assembly of this invention. Terminal assembly 10 includes a terminal body 12 and a conductive metal foil tab 30. The first folded slotted shoulder 15 and second folded slotted shoulder 17 are folded at first fold 24 and at second fold 26, respectively, such that they contact the tongue 32 of the conductive metal foil tab 30 which is in contact with dimples 22 of terminal body 12. The tongue 32 of the conductive metal foil tab 30 is mechanically secured to the terminal body by dimples 22 in combination with the slot 20 of the first folded slotted shoulder 15 and second folded slotted shoulder 17. The dimples 22 force a portion of the tongue 32 of conductive metal foil tab 30 into the slot 20 of the first and second folded shoulders 14 and 16. The conductive metal foil tab 30 thus is mechanically and conductively grasped by the terminal body and is relatively inflexible and less prone to disassociate itself from the terminal body in comparison to metal foil tabs soldered to the terminal body.

Terminal body 12 of terminal assembly 10 is fabricated from an electrically conductive material such as a metal. Blade 18 of terminal body 12 provides a male connection site where the terminal assembly 10 can be connectorized to an electrical source. It is preferred that terminal body 12 be manufactured out of copper or a copper alloy that is malleable enough to allow first and second slotted shoulders 14 and 16 to be folded, and to allow for the punching of dimples 22.

Dimples 22 provide the site at which the tongue 32 of the conductive metal foil tab 30 is mechanically fixed to terminal body 12. Terminal body 12 may be manufactured with dimples 22 or, alternatively, terminal body 12 may be punched to produce dimples 22. When terminal body 12 is punched to produce dimples 22, the side of terminal body 12 opposite the dimples exhibits depressions corresponding to the location of each dimple 22.

Figure 7:
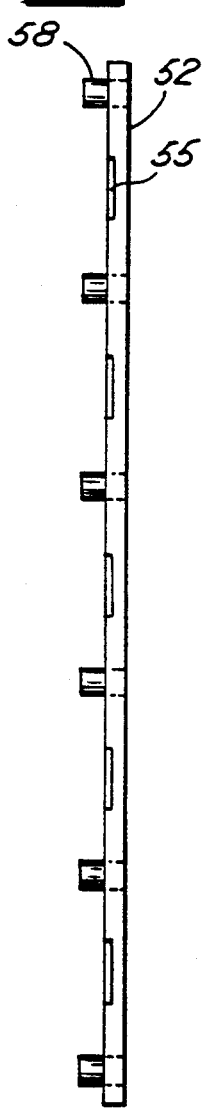
Figure 8:
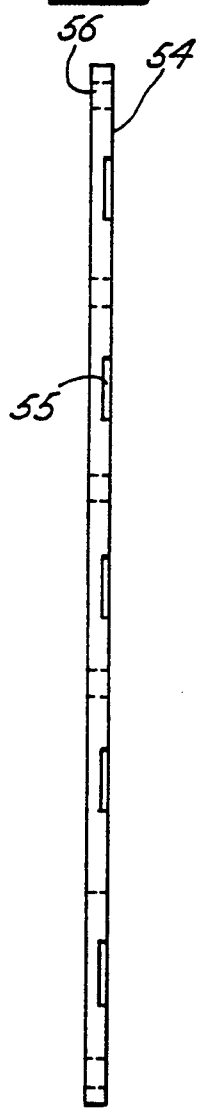
FIG. 8, and 9 are front and side views of a connector housing bottom of this invention.
Figure 9:
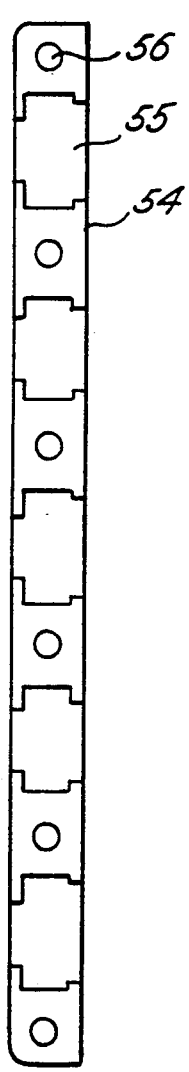

FIGS. 6 and 7 depict front and side views of connector housing top 52. FIGS. 8 and 9 depict front and side views of connector housing bottom 54 of this invention. FIGS. 10, 11, and 12 depict front, top, and end views of connector 50 of this invention. The purpose of connector 50 is to reproducably unite a plurality of terminal assemblies 10 in a single unit where there is reproducible spacing between terminal assemblies. By reproducing the spacing between terminals from connector to connector, connector 50 can be connectorized to a generic female connector.

Connector 50 includes a connector housing top 52 and a connector housing bottom 54. The connector housing top and bottom 52 and 54 each contain a plurality of depressions 55 that are complementary to various shaped terminal assemblies 10. A terminal assembly 10 is placed in each depression of either the connector housing top or the connector housing bottom 52 and 54. Terminal assemblies 10 are captivated in connector housing 51 to define a connector 50.

It is preferred that one of the connector housing pieces includes a plurality of locating pins 56 while the other connector housing piece includes a plurality of holes 58 complementary to locating pins 56. The locating pins 56 and holes 58 facilitate in both uniting and securing the connector housing top and bottom 52 and 54.

The connector housing top and connector housing bottom 52 and 54 are manufactured from a non-metallic material such as plastic. In fact it is preferred that an electrically insulating material be used to manufacture the connector housing top and bottom 52 and 54. The connector housing top and bottom 52 and 54 may be adhesively secured or mechanically secured to one another to define a connector housing 51. Connector housing top and bottom 52 and 54 are preferably secured to one another by heat staking by sonic welding to define connector housing 51. If heat staking is used locating pins located on one connector housing portion 56 are heat staked to the connector housing portion containing holes 58.

The connector 50 has a connector housing 51 through which protrudes the body 34 of the conductive metal foil tab 30 of each terminal assembly 10. The blade 18 of each terminal assembly 10 also protrudes from connector body 51. All blades protrude from a single dimension of connector body 51 and all conductive metal 18 foil tab bodies 34 also protrudes from a single dimension of the connector body.

FIGS. 13 and 14 depict side and top views of a laminated assembly 40 including a plurality of controlled spaced terminals defining connector 50. The laminated assembly 40 includes a first sheet of nonconductive material 42 and a second sheet of nonconductive material 44 divided by a layer of conductive polymer 46. Typically, the first nonconductive material 42 and second nonconductive material 44 are sheets of glass. An adhesive 48 will typically be located on one side of the body 34 of conductive metal foil tab 30 of each terminal assembly 10 captivated by connector housing 51.

To manufacture a laminated article, the body 34 of conductive metal foil tabs 30 making up conductor 30 are adhesively attached to the first sheet of nonconductive material 42 such that connector housing 51 abuts the edge of the first sheet of nonconductive material 42. A conductive polymer is then placed into contact with both the body 34 of the conductive metal foil tab 30 and the first sheet of nonconductive material 42 to form a conductive polymer layer 46. A second sheet of nonconductive material 46 is then contacted with the conductive polymer layer 46 and located such that the edge of the second sheet of nonconductive material 44 abuts connector housing 51. The first sheet of nonconductive material 42 and the second sheet of nonconductive material 44 are bound by the conductive polymer layer 46 to produce a finished laminated article by curing the assembly in a furnace. The furnace also allows the assembly to be contoured.

The description above has been offered for illustrative purposes only, and it is not intended to limit the scope of the invention of this application which is defined in the following claims.

What is claimed:

1. A terminal assembly for electrically uniting an electric current source with a conductive polymer laminated between non-conductive materials comprising a conductive metal foil tab having a tongue and a body, and a terminal body, including a blade, a first folded slotted arm and a second folded slotted arm both foldably associated with the blade which includes one or more dimples which force the tongue of the conductive metal foil tab to protrude into the slots of the first and second folded slotted arms.

2. The terminal assembly of claim 1 wherein the blade has from 2 to 5 dimples.

3. The terminal assembly of claim 1 wherein one dimension of the body of the conductive metal foil tab includes an adhesive.

4. A method of manufacturing a terminal assembly comprising a conductive metal foil tab having a tongue and a body, and a terminal body including a first slotted arm, a second slotted arm, and a blade having one or more dimples complementary to slots on the first and second slotted arms comprising the steps:

a. placing the tongue of the conductive metal foil tab into contact with one or more dimples located on the blade so that the body of the conductive metal foil tab extends beyond the terminal body; and b. securing the conductive metal foil tab to the terminal body by folding the first and second slotted metal arms towards the dimension of the terminal body containing the dimples until the dimples and a portion of the tongue of the conductive metal foil tab protrude into the slots of the first and second folded slotted arms.

5. The method of manufacturing a terminal assembly of claim 4 wherein the first slotted arm is folded before the second slotted arm is folded.

6. The method of manufacturing a terminal assembly of claim 4 wherein the connector is laminated between non-conductive materials by the additional steps of:

i. placing two or more terminals into complementary depressions in a connector housing top such that the blade and the body of the conductive metal foil tab of each terminal assembly extends beyond the connector housing top;

ii. captivating the plurality of terminal assemblies in a conductor housing by securing a connector housing bottom to the connector housing top to define a conductor;

iii. attaching the body of the conductive metal foil tabs of the connector to a first sheet of non-conductive material;

iv. placing a conductive polymer into contact the with both the conductive metal foil tabs and the first sheet of non-conductive material to define a conductive polymer layer;

v. placing a second sheet of non-conductive material into contact with the conductive polymer layer to define a laminated article; and conductive polymer layer to define a laminated article; and vi. curing the laminated article with heat to define a finished laminated article.

7. The method of manufacturing a connector of claim 6 wherein the body of the each conductive metal foil tab is adhesively attached to the first sheet non-conductive material.

8. The finished laminated article prepared by the method of claim 6.

* * * * *